3,271,099
FILM-GUIDING TRACKS OR CHANNELS IN
CINEMATOGRAPHIC APPARATUS
André Victor Léon Clément Debrie, 131 Ave. de Malakoff,
Paris, France
Filed Jan. 30, 1964, Ser. No. 341,380
Claims priority, application France, Feb. 14, 1963,
924,822
4 Claims. (Cl. 352—224)

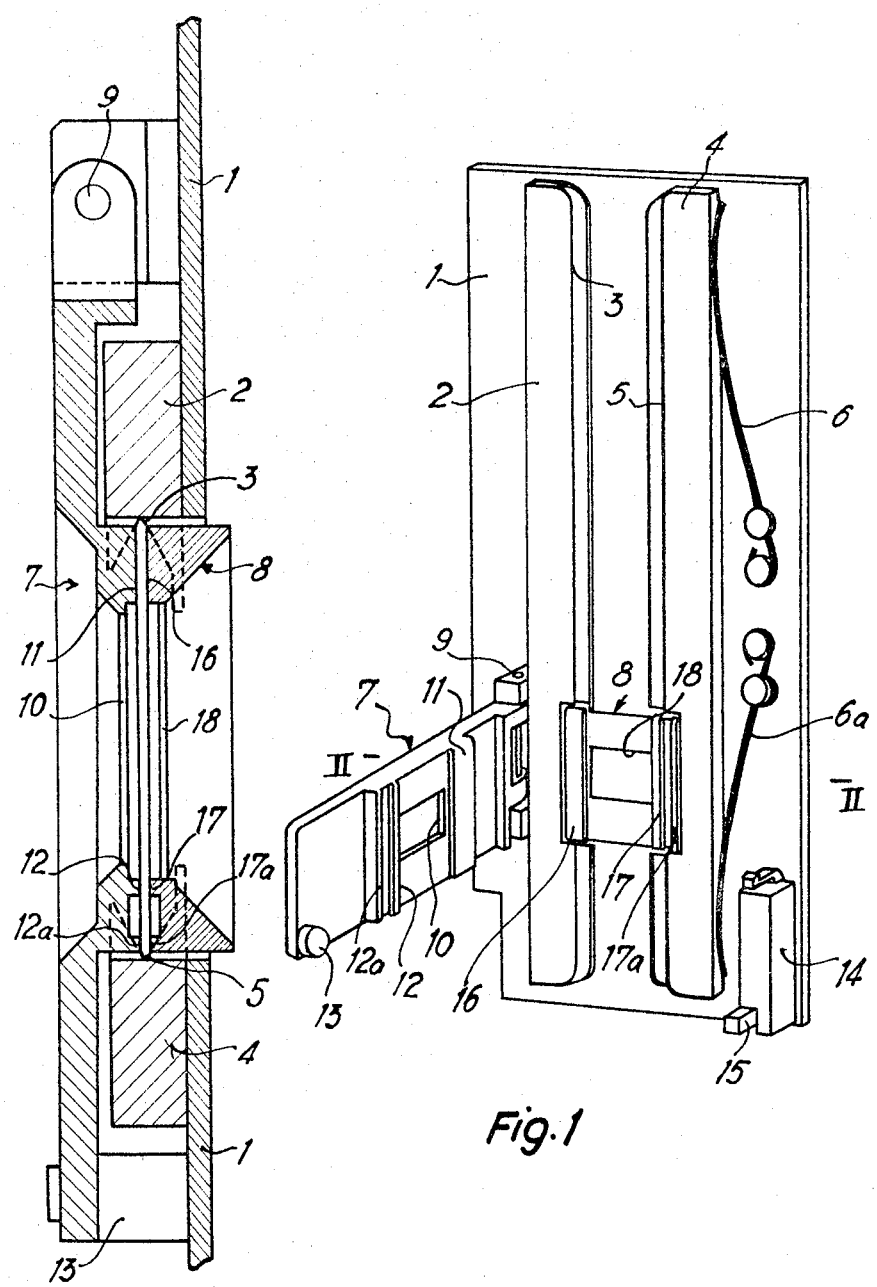

The present invention relates to the channels or tracks used in cinematographic cameras, printing apparatus or projectors for guiding the film and positioning it behind the objective.

Such tracks must conform to a certain number of conditions: they are designed in such a way as to prevent any slipping of the film, except during periods when the latter advances under action of the driving means. Furthermore, it is expedient to ensure a local flatness of the film which is as perfect as possible at the position of the objective. The tracks in use at the present time do not permit obtaining all the results indicated above, or they have disadvantages which can have quite serious consequences on the good operation of the apparatus to which they are fitted.

Thus, pressure guide tracks have already been proposed which, even if they fulfill quite satisfactorily their function of braking the film and of suppressing the curvature of the latter, they have the serious disadvantage of rubbing on the film and of readily scratching the latter. In addition, the particles removed by friction agglomerate to a greater or lesser degree, particularly under the effect of the heat occurring locally in the case of a projector.

In order to obviate this serious disadvantage, it has been proposed to use tracks in which the film is guided at its edges, which extend into grooves of V-section. With a V-section groove suitably pressed towards the other V-section groove, a very satisfactory braking of the film is obtained while achieving a maximum decrease in the wear to which the latter is subjected. On the other hand, there is the danger of an accentuated curling being produced, which can be harmful in the vicinity of the image aperture or gate. This is the case when the strips carrying the V-section grooves are rectilinear.

The invention has for its object an improved track which more especially makes its possible to obviate the various disadvantages referred to above, while retaining the advantages of the prior arrangements.

To this end, according to the invention, the guiding of the film is assured by two strips provided with V-shaped grooves, these strips being interrupted at the level of the image aperture, where there is located, on either side of the film, a film gate or an apertured masking plate and a shoe co-operating with the said film gate for bearing on the margins of the film outside the image and possibly the sound track.

Thus, by the action exerted on the margins of the film at the position of the image aperture, the flatness of the film is re-established without thereby causing any substantial wear on the latter.

The description which follows, together with the accompanying drawing to which reference will be made, will enable it to be better understood how the invention can be carried out in practice.

In the accompanying drawing, given simply by way of example:

FIGURE 1 is a perspective view of a film guide track according to the invention; and FIGURE 2 is a sectional view to a larger scale on the line II—II of FIGURE 1, with the film gate closed.

In FIGURE 1, the reference 1 indicates a plate which carries a fixed strip 2 formed with a V-shaped groove 3. Disposed parallel to the strip 2 is another strip 4, which is also formed with a V-shaped groove 5 and under the action of springs such as 6 and 6a. These springs tend to move the strip 4 towards the fixed strip 2 in order to grip the film (not shown), the margins of which are engaged in the V-shaped grooves 3 and 5.

As shown in FIGURE 1, the strips are broken away at the position of the film gate. At this position, the gripping action exerted on the edges of the film is replaced by a gripping action exerted perpendicularly of the plane of the film and provided by the co-operation of a film gate or apertured masking plate 7 and a pressure shoe 8. Nevertheless, it is to be noted that the force exerted perpendicularly is quite small, because it is intended solely to ensure the flatness of the film in the region of the gate, while the force exerted by the V-shaped grooves serves particularly for braking the film.

The film gate 7 is adapted to pivot about a pivot pin 9 and is formed with an aperture 10. On each side of the aperture 10 and parallel to the winding direction of the film, the film gate 7 carries projections on its inner face which are designed to be applied to the margins of the film outside the image and possibly outside the sound track. Thus, on one side of the aperture 10, it carries a flat ledge 11, while on the other side it has two projecting ledges 12 and 12a, disposed on either side of the sound track. The film gate 7, provided with a suitable stop 13, is locked in the closed position by a spring device 14 which is advantageously equipped with an unlocking system 15.

Situated on the other side of the film is the pressure shoe 8 which has projecting parts corresponding to those of the pivoting film gate 7, namely, on one side a ledge 16 and on the other side two ledges 17 and 17a which face the ledges 12 and 12a. This shoe is subjected to the action of springs (not shown) in order to bear with a suitable force against the film abutting against the parts 12 and 12a of the film gate 7. Obviously, the shoe 8 is formed with an aperture 18 equal in size to the aperture 10, that is to say, at least equal to each of the images or frames on the film.

The braking action exerted on the film by the strips comprising V-shaped grooves can be very long or short, depending on the type of apparatus, and particularly according to whether the apparatus is a projector, a film printing apparatus or a cinematographic camera. Moreover, the braking strips can be rectilinear or curved.

It is obvious that the embodiment which has been described may be modified in various ways without thereby departing from the scope of the present invention.

What is claimed is:

1. A film guide track for cinematographic apparatus for controlling the braking of film as it moves longitudinally along said guide track comprising two spaced opposing strips having V-shaped grooves mounted on a fixed plate and adapted to be oppositely engaged by the longitudinal edges of the film therebetween, at least one of said strips being movable and subjected to the action of spring means towards the other strip, said strips being interrupted in their lengthwise direction about a portion of said plate where an image aperture is located, a film gate and a shoe cooperating with said film gate located at said aperture being located on either side of said plate, said film gate and said shoe in combination being adapted to bear upon peripheral margins of the film, said margins being exterior at least of the image track, whereby said strips insure the braking of the film while said film gate and said shoe insures the flatness of the film at the location of said image aperture.

2. A film guide track according to claim 1, wherein said film gate is pivoted about a fixed pivot on said plate, and comprises projecting parts which penetrate into said aperture when said film gate is pivoted against said aperture so as to bear upon margins of the film parallel to the winding direction of the latter.

3. A film guide track according to claim 2, comprising a spring device for locking said pivoted film gate when applied against said aperture, and abutment means for limiting the penetration of said projecting parts into said aperture.

4. A film guide track according to claim 2 for a film having an image track and a sound track, wherein said shoe comprises further projecting parts, said projecting parts of said film gate and said further projecting parts of said shoe are opposed when said film gate is applied against said aperture and comprise a flat ledge parallel to the winding direction of the film near one edge of the image and two parallel ledges arranged so as to be disposed on either side of the sound track near the other edge of the image.

References Cited by the Examiner

UNITED STATES PATENTS

| | | | |
|---|---|---|---|
| 1,884,609 | 10/1932 | Dina | 352—224 |
| 2,229,924 | 1/1941 | Howell | 352—224 |
| 3,129,633 | 4/1964 | Mees | 352—224 |

FOREIGN PATENTS

| | | |
|---|---|---|
| 895,982 | 4/1944 | France. |

JULIA E. COINER, *Primary Examiner.*